May 31, 1932.                P. D. BREWSTER                1,860,525
                              COLOR PHOTOGRAPHY
                         Original Filed March 14, 1921
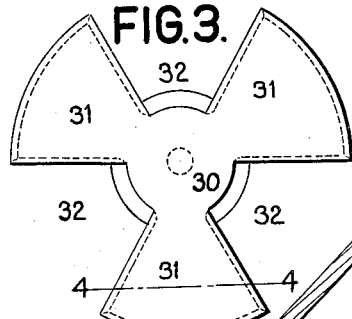
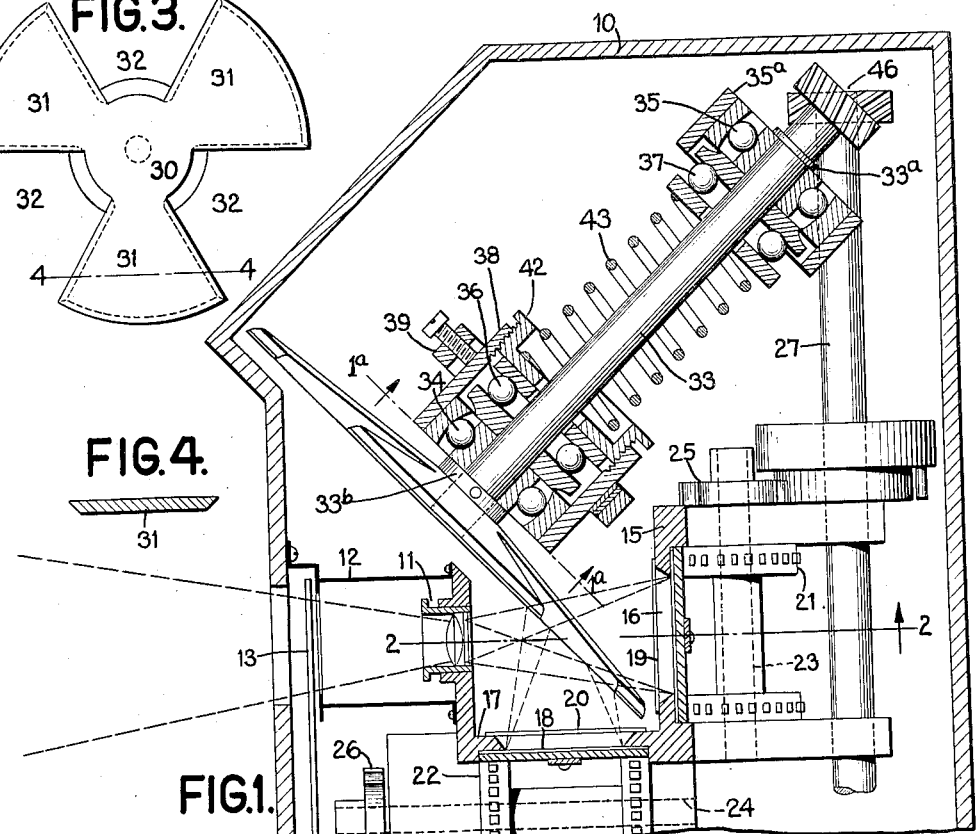
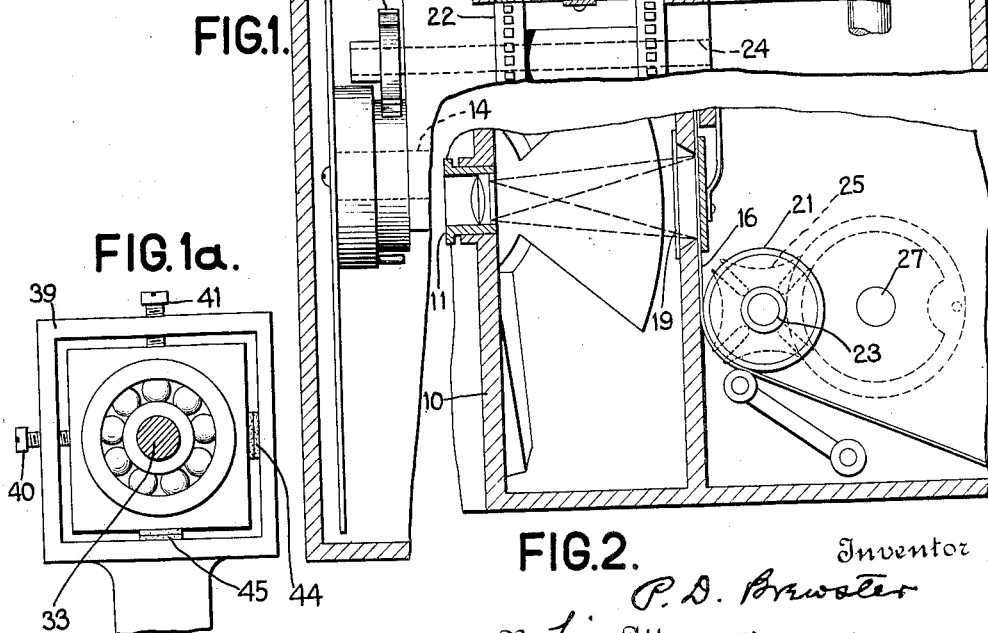
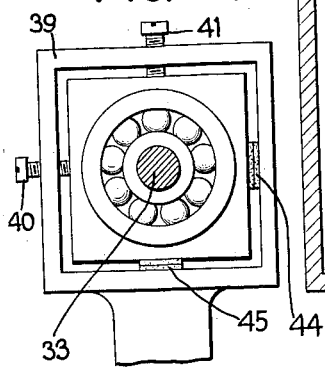
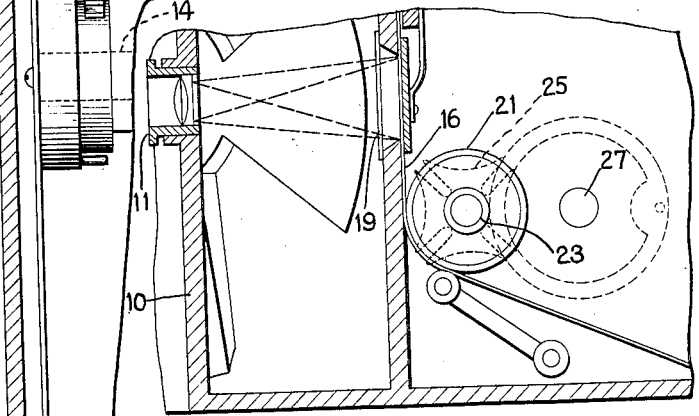
Inventor
P. D. Brewster
By his Attorneys
Cooper, Kerr & Dunham Patented May 31, 1932

1,860,525

UNITED STATES PATENT OFFICE

PERCY D. BREWSTER, OF EAST ORANGE, NEW JERSEY

COLOR PHOTOGRAPHY

Original application filed March 14, 1921, Serial No. 452,160. Divided and this application filed March 27, 1930. Serial No. 439,406.

In methods of making photographs in color, as for example color cinematography, in which two or more optical images are formed in the same exposure period to produce a corresponding number of color-value negative images of the object, the light received or transmitted by the optical projecting devices of the camera is divided by so-called light-splitting means and the several parts of the light are projected through color filters, usually red and green, upon different sensitive surfaces or upon different parts of the same sensitive surface. The latent images so produced are developed and fixed, thus yielding two or more series of color-value images which may be utilized in any suitable manner for printing positives, say upon opposite sides of a film sensitized on both sides.

In my copending application Serial No. 452,160, (now Letters Patent No. 1,752,477) filed March 14, 1921, of which the present application is a division, I have described and claimed a color cinematographic camera in which the splitting of the light is effected by a plane mirror revolving in the path of the light rays at an angle thereto and having one or more light-passing openings so that as the mirror revolves the rays will be alternately reflected to one of the light-sensitive surfaces and passed to another of said surfaces. The mirror is mounted preferably behind the camera lens in a plane cutting the optical axis thereof at an angle, usually 45°, so that as the mirror revolves, the light will be reflected when a reflecting portion of the mirror is in the path of the rays and will be transmitted when one of the openings is in the path. The mirror may be made of any suitable material, as glass or metal, preferably the latter, in which case any metal convenient and suitable for the purpose can be employed, as for example speculum metal, silver, or brass or steel silvered on its front surface. Unsilvered nickel is satisfactory, as it will take a sufficiently high polish for most purposes without silvering and possesses the rigidity necessary to prevent distortion under the stresses to which it is ordinarily subjected in the camera. Moreover, nickel can easily be rendered free of internal stresses or strains and hence can be accurately figured.

My present invention relates to the mounting of the mirror, and its chief object is to provide a mounting which will permit ready and accurate adjustment of the mirror to the position which it should occupy in the path of the rays. To this and other ends the invention comprises the novel features and combinations hereinafter described.

It is believed that the invention will find its chief utility in color cinematography, and accordingly it will be described hereinafter with special reference to that field, but it is to be understood that the invention is not limited in that respect.

In the accompanying drawings:

Fig. 1 is a sectional plan view, somewhat diagrammatic, illustrating a motion picture camera embodying my invention in its preferred form.

Fig. 1a is a detail section on line 1a—1a of Fig. 1, illustrating the adjustment of the revolving mirror vertically and horizontally.

Fig. 2 is a sectional side view, looking from the bottom of Fig. 1, on line 2—2 of the latter figure.

Fig. 3 is a front view of the revolving mirror.

Fig. 4 is a section of one of the reflecting sectors of the mirror on line 4—4 of Fig. 3.

In the camera illustrated in Fig. 1, 10 indicates the usual light-tight casing or box. The lens 11, constituting optical projecting means for the camera, is protected by a hood 12, in front of which is a sector-shutter 13 which may be of the conventional type. As shown it is mounted on a shaft 14, driven by a crank (not shown) suitably connected thereto in any well known manner.

Immediately back of the lens 11 is a film gate 15 to support a film, as 16, in a plane at right angles to the optical axis of the lens, and at right angles to the film gate 15 is a second film gate 17, to support a film, as 18, in a plane parallel to the optical axis and perpendicular to the plane of film 16. Suitable color-filters are provided, as for example a red or orange-red filter 19 in front of film 16 and a green or blue-green filter 20 in front of film 18. Any suitable mechanism may be employed for feeding the films through the film gates simultaneously step-by-step (one picture-space at each step), for example the conventional Geneva movement type of mechanism. The latter (omitting the upper sprockets provided to maintain the usual upper loops) include lower feed sprockets 21, 22 on shafts 23, 24 which are driven by Geneva movements 25, 26 from shafts 27 and 14 which are themselves connected together by any suitable gearing (not shown) so as to rotate in unison. It will be understood that the shutter, on shaft 14, is set to operate in harmony with the film-feeding devices, exposing the films while they are at rest and obscuring them while they are in motion through their film gates. It is deemed unnecessary to illustrate the film magazines, take up reels, etc., inasmuch as these and the other parts may be of the conventional character, well understood in the moving picture art.

The light-splitting mirror 30, shown in Figs. 1, 2 and 3, is in the form of a disk with sector-shaped reflecting portions 31 and intermediate openings 32 of the same shape. As stated, the mirror may be made of solid nickel, with its front reflecting surface or surfaces accurately figured to an optical plane and highly polished. It is fixed firmly on a shaft 33, mounted in running bearings 34, 35, of the ball type, with ball thrust-bearings 36, 37. The outer race of bearing 35 is mounted in any convenient and suitable manner (not shown) upon a stationary part of the apparatus, and the outer race of the front bearing 34 may be mounted in a fixed or adjustable support 38. Preferably the latter is mounted in a fixed or adjustable carrier 39, provided with vertical and horizontal adjusting screws 40, 41, bearing on the support 38. The rear of the collar or carrier 38 has a threaded cup 42 to receive the forward end of spring 43, encircling the shaft, and the rear end of the spring bears on the rear thrust-bearing, which in turn bears on the inner races of the running bearings.

As indicated in Fig. 1, the splitting mirror extends edgewise into the space behind the lens, at an angle to the optical axis thereof. It is in general important that the reflecting plane of the mirror be so positioned that the reflected axial ray will strike the film at right angles. In practice I prefer to construct and position the parts as accurately as possible, and then make a final adjustment by means of the screws 40, 41, and shims 44, 45, opposite the same, by which the shaft 33 can be swung laterally and vertically within sufficient limits to compensate for inaccuracies of the construction, etc. In this adjustment the shaft swings on a center which is coincident with the center of curvature of the spherical inner surface of the outer race. Since this point is remote from the front bearing, a very minute amount of shake or backlash in the gears permits a substantial movement of the mirror.

The outer races of the running bearings have a snug sliding fit in the collars 38 and 35a, and the inner race of the rear bearing rests against a collar 33a on shaft 33, to prevent forward displacement of the shaft relative to the rear bearing. The carrier 39 is axially stationary, and the hub 33b of the mirror prevents rearward movement of the shaft relative to the front bearing. Hence screwing the cup 42 into the carrier 39 shifts the shaft 33 and all the bearings forwardly in the collars 38, 35a, and backing the cup out permits the shaft and bearings to be pulled or pushed backwardly.

From the foregoing it will be observed that by means of the adjusting devices provided (in the mechanism shown, the screws 40, 41 and shims 44, 45) the mirror is universally adjustable radially, and can also be adjusted axially, so that the axial ray of the reflected beam can be made to strike the film 18 at right angles and the image on the film can be shifted transversely thereof to bring the image to the same relative position thereon as the image produced by the unreflected rays on film 16. In this way perfect agreement of these images in size and definition and in their positions on the respective films can be obtained, as is desirable for subsequent utilization of the photographic images produced by development.

The mirror shaft 33 is driven from shaft 27 by gearing 46. As shown in Fig. 1, the ratio of the gearing is such that the mirror will be rotated at least once in each revolution of the shaft 27. Further (see also Fig. 2) the maltese crosses 25, 26, are actuated to feed the films one step in each revolution of shafts 14, 33, which, as stated hereinbefore, are connected by gearing (not shown) to rotate in unison. Hence in each cycle of operation of the camera, i. e., from the beginning of one film feeding operation to the beginning of the next, the mirror will rotate at least one complete revolution, thus giving with the three bladed mirror shown, a plurality of transmissions and a plurality of reflections in each period of exposure. Two revolutions in each cycle, obtained by the employment of suitable gearing at 46, give a correspondingly greater number of transmissions and reflections in each cycle, but it is to be understood that the speed of revolution of the mirror may be greater or less without departing from the spirit of my invention. Better results are obtained, however, with a mirror speed sufficient to give several transmissions and reflections in each exposure period.

The straight and curved edges of the reflecting portions of the mirror are preferably beveled to a knife edge, as indicated in Fig.

4, so that there will be no sensible reflection except from the front surface of the mirror.

It is to be understood that the invention is not limited to the apparatus herein specifically illustrated and described but can be embodied in other forms without departure from its spirit as defined by the following claims.

I claim—

1. A camera for color photography, having in combination, optical means to receive light rays and project the same, rotatable light-splitting mirror arranged in the path of the rays to reflect and pass the same alternately, means for shifting the mirror axially of its axis of rotation to shift laterally the image produced by the reflected rays, and mirror-displacing means for shifting the axis of the mirror radially to vary the angles of incidence and reflection of the reflected rays.

2. A camera for color photography, having in combination, a lens, means in rear of the lens to support light-sensitive surfaces in position for exposure to light rays projected by the lens, a plane light-splitting mirror arranged to rotate in the path of the projected rays and at an angle thereto, to reflect light rays to one of said surfaces and pass light rays to another, in alternation, a rotatable shaft on which the mirror is mounted, and means for shifting the shaft axially and radially to obtain agreement of the images on said surfaces in size and definition and in relative position.

3. A camera for color photography, having in combination, a rotatable light-splitting mirror to alternately reflect and pass light rays, means for supporting light sensitive surfaces in position to receive reflected and passed light respectively, a shaft on which the mirror is mounted, front and rear bearings for the shaft, means for shifting the shaft and mirror axially, and means for shifting the shaft and mirror radially on a center in rear of the front bearings.

4. A camera for color photography, having in combination, a rotatable mirror for alternately reflecting and passing light rays, a shaft on which the mirror is mounted, front and rear bearings for the shaft, the rear bearing constructed for rocking displacement of the shaft therein, supports for the bearings in which bearings are axially shiftable, a carrier for the front bearing, and means for shifting the front bearing transversely in the carrier.

5. A camera for color photography, having in combination, a lens to project light rays received from an object to be photographed, a rotary light-splitting mirror in rear of the lens at an angle to the axis thereof to alternately reflect and pass the projected rays, means for supporting a light-sensitive surface in a plane perpendicular to the axis of the lens for exposure to the passed rays, means for supporting a light-sensitive surface in a plane at an angle to the first mentioned surface to receive reflected rays, a shaft on which the light-splitting mirror is mounted, bearings for the shaft, and means for swinging the shaft and mirror transversely of the axis thereof to vary the angular relation of the mirror to the axis of the lens.

6. A camera for color photography, having in combination, a lens to project light rays received from an object to be photographed, a rotary light-splitting mirror in rear of the lens at an angle to the axis thereof to alternately reflect and pass the projected rays, means for supporting a light-sensitive surface in a plane perpendicular to the axis of the lens for exposure to the passed rays, means for supporting a light-sensitive surface in a plane at an angle to the first mentioned surface to receive reflected rays, a shaft on which the light-splitting mirror is mounted, bearings for the shaft, means for swinging the shaft and mirror transversely of the axis thereof to vary the angular relation of the mirror to the axis of the lens, and means for shifting the mirror axially to shift the image produced by the reflected rays on the respective light-sensitive surface.

7. A camera for color photography, having optical projecting means, a rotary light-splitting mirror arranged at an angle to the optical axis of said means to alternately reflect and pass light rays, means for supporting light-sensitive surfaces one in position for exposure to reflected rays and another in position to receive passed rays, a shaft on which the mirror is mounted, a bearing support at one end of the shaft, a bearing for the shaft, mounted in the support and constructed for rocking displacement of the shaft therein, a bearing support at the other end of the shaft, a shaft bearing mounted in the last mentioned support, and means associated with the last mentioned support to shift the last mentioned bearing and thereby effect swinging adjustment of the shaft and mirror.

8. A camera for color photography, having optical projecting means, a rotary light-splitting mirror arranged at an angle to the optical axis of said means to alternately reflect and pass light rays, means for supporting light-sensitive surfaces one in position for exposure to reflected rays and another in position to receive passed rays, a shaft on which the mirror is mounted, a bearing support at one end of the shaft, a bearing for the shaft, mounted in the support and constructed for rocking displacement of the shaft therein, a bearing support at the other end of the shaft, a shaft bearing mounted in the last mentioned support, means associated with the last mentioned support to shift the last mentioned bearing and thereby effect swinging adjustment of the shaft and mirror, and means for shifting the shaft and the shaft bearings axially in said supports.

9. A camera for color photography, having optical projecting means, a rotary light-splitting mirror arranged at an angle to the optical axis of said means, a shaft on which the mirror is mounted, front and rear bearings for the shaft, the shaft having a stop cooperating with the rear bearing to prevent forward axial displacement of the shaft, relative to the rear bearing, a support in which the rear bearing is axially movable, a support in which the front bearing is axially movable, an axially adjustable abutment carried by the last mentioned support to shift the front bearing axially, a stop to prevent rearward displacement of the shaft relative to the front bearing, and spring means coacting with the said abutment and the rear bearing to urge the latter against the first mentioned stop, whereby the shaft, mirror and bearings can be shifted axially by axial adjustment of said abutment.

10. The mechanism described in claim 9, in combination with adjusting means cooperating with one of the bearing supports to swing the same and the shaft transversely of the shaft for varying the angular relation of the mirror to the optical axis of the optical projecting means.

11. In a camera for color photography, the combination of optical means to receive light rays and project the same, a light-splitting mirror disposed for rotation about an axis and arranged in the path of the rays to reflect and pass the same alternately, and mirror-shifting means for varying the arrangement of the image produced by the reflected rays, said means being adapted to rock the axis of the mirror radially for varying the angular relation of the mirror to the path of the light rays.

12. In a camera for color photography, the combination of optical means to receive light rays and project the same, a rotary light-splitting mirror arranged in the path of the rays to reflect and pass the same alternately, a shaft on which the mirror is disposed for rotation, said shaft being mounted for rocking displacement, and means for shifting the mirror to vary the arrangement of the image produced by the reflected rays, said means including a bearing member disposed about the shaft, and a support for the bearing member, and said means having also screw means adjustably carried by the support and adapted to engage the said member, and variable spacing means disposed between member and the support for cooperation with the screw means, whereby the member may be displaced in the support to rock the shaft radially and vary the angular relation of the mirror to the path of the light rays.

In testimony whereof I hereto affix my signature.

PERCY DOUGLAS BREWSTER.